Patented Feb. 9, 1937

2,070,167

UNITED STATES PATENT OFFICE 2,070,167

METHOD OF MAKING LIQUID SPRAYS

Carl Iddings, Kew Gardens, N. Y.

No Drawing. Application September 23, 1932.
Serial No. 634,598

11 Claims. (Cl. 167—13)

My invention relates broadly to sprays and more particularly to self-propelled liquids used as sprays.

The primary object of my invention resides in making liquids such as insecticides, moth proofing compounds, fumigants, weed killers, fly sprays, paints, enamels, antiseptic solutions, etc., self-propellant from containers that are provided with gas-tight valve arrangements like the container and valve disclosed and claimed in my copending application filed of even date herewith.

In the present use of liquid insecticides, moth-proofing compounds, fumigants, weed killers, fly sprays, etc., by spraying, costly and cumbersome equipment is required for propelling the liquid through some form of spray nozzle. In the larger scale work, such as in the spraying of trees, shrubs, vines, etc., a portable pump, either hand or power driven, is used. In spraying smaller objects, such as clothing or furniture for moth proofing purposes, or in using fly sprays, etc., hand pumps of various designs are usually used, although small power driven pumps may also be used. In either case, it is necessary to transfer the liquid from its container as shipped into a receptacle attached to the hand pump, or to insert a separate hand pump into the container in which the liquid is received. The hand operated pumps usually require both hands of the operator for their operation, thus preventing the operator from performing other operations, such as holding a garment, while manipulating the pump. Thus, it is another object of my invention to provide a self-propelled liquid that can be easily and readily applied or sprayed through the use of one hand from the original container in which it is placed, thereby eliminating the transferring of the liquid to an extraneous pump or the use of costly equipment involving forced air or gas under high pressures.

It is a further object of my invention to make a liquid spray self-propellant so as to eliminate all unnecessary spillage, evaporation and wastage and, at the same time, do away with pumping or manipulative action, other than the simple depression of a valve stem by the use of one finger or thumb which permits an operator to more effectively direct the spray so as to thoroughly and evenly cover the object to be sprayed.

Still a further object of my invention is to provide a method of making liquids self-propellant which will be relatively simple and inexpensive to manufacture, and one that is convenient, economical and effective.

In my invention I effect the propulsion of the liquid to be sprayed by means of the presence within or upon this liquid of a suitable amount of one or more volatile substances, the boiling points of which at 760 mm. absolute pressure are lower than normal atmospheric temperature. This volatile component, or mixture of volatile components, of the liquid to be sprayed may be soluble or insoluble, miscible or immiscible with said liquid. In the event that the volatile component is insoluble in the liquid to be sprayed, it is preferable that the component should have a lower specific gravity than the liquid, although this feature is not absolutely necessary.

By volatile component is meant a substance that under a total absolute pressure of one (1) atmosphere (760 mm. of mercury) will boil or sublime at a temperature equal to or below 25° C., i. e., one which at 25° C. will have a vapor pressure equal to or in excess of atmospheric pressure (760 mm. mercury, absolute). If a mixture of volatile components is used, the mixture may or may not be homogeneous but, under a total absolute pressure of one (1) atmosphere (760 mm. mercury) will boil or sublime at a temperature equal to or below 25° C. The volatile component or mixture may comprise any desired proportion from 0.01% to 100% of the liquid to be sprayed, but it must be such that at 25° C. or above, a suitable but moderate pressure is created within the container adequate for propelling the liquid through a tube and spray nozzle thereby generating a fine uniform spray. If the volatile component is soluble in the liquid to be sprayed, or, if it constitutes the liquid to be sprayed, it, the component, functions by creating within the container a pressure slightly greater than that of the external atmosphere, by means of its high vapor pressure, thereby forcing liquid up through a tube to a release valve. When the valve is opened, the component, by vaporizing or boiling as it passes out through a spray nozzle, assists not only in imparting velocity to the remaining liquid drops but also aids in breaking the liquid into very small droplets. If the added component is not miscible with the liquid to be sprayed but is lighter in specific gravity, it will float upon the top as a layer and by exerting downward pressure on the liquid to be sprayed will force the liquid when the release valve is opened up through an outlet tube to and through the spray nozzle. Mixtures of volatile components may be used, that is, soluble volatile components may be used in conjunction with insoluble components, if desired.

In making a liquid, such as insecticides, mothproofing compounds, fumigants, weed killers, fly sprays, paints, enamels, antiseptic solutions, etc., self-propellant in accordance with my invention, the liquid is first cooled to a temperature below 25° C. at one atmospheric pressure (760 mm. mercury), next a measured amount of volatile substance (or of a mixture of volatile substances) is likewise cooled to the same temperature as the liquid, and then the volatile substance (or substances), while the temperatures of all the components are maintained approximately constant, is (or are) added to the liquid. The resultant is then sealed within a container that has also been cooled to the same temperature as the contents and there the liquid is permitted to slowly warm up to a temperature approximately that of the atmosphere surrounding the container. The container in which the liquid is finally placed should be equipped with a suitable release valve arrangement, such as disclosed in my aforementioned application, thus making the same ready for use.

One method whereby the cooling of the volatile component may be effected is to place the volatile component in a thermally insulated container and then to permit a portion of it to boil or volatilize at atmospheric pressure or less. This action results in cooling the remainder of the volatile liquid to the boiling or subliming point of the volatile component at one atmosphere pressure. The cooled remainder of the volatile component may then be added in whole or in part to the liquid to be made self propellant, preferably after said liquid has been cooled by any convenient means to the same low temperature as the volatile component.

As the added volatile component, or components, in carrying out my invention, I may make use of any of the following, either singly or in any desired combination with each other, or in any desired combination with other substances:

| Substance | Formula | Approximate boiling point at 1 atmosphere (760 mm. mercury absolute) degrees centigrade |
|---|---|---|
| Ethylene | $C_2H_4$ | −103.8 |
| Ethane | $C_2H_6$ | −88.3 |
| Acetylene | $C_2H_2$ | −83.6 |
| Carbon dioxide | $CO_2$ | subl. −78.5 |
| Methyl fluoride | $CH_3F$ | −78.0 |
| Ketene | $CH_2.CO$ | −56.0 |
| Carbon oxysulfide | $COS$ | −48.0 |
| Normal propane | $CH_3.CH_2.CH_3$ | −44.5 |
| Ammonia | $NH_3$ | −33.4 |
| Dichlorodifluoromethane | $CCl_2F_2$ | ca. −30.0 |
| Dimethylether | $CH_3.O.CH_3$ | −24.9 |
| Methyl chloride | $CH_3Cl$ | −23.0 |
| Vinyl chloride | $CH_2.CHCl$ | −15.0 |
| Sulfur dioxide | $SO_2$ | −10.0 |
| Methyl amine | $CH_3NH_2$ | −6.5 |
| Trimethylamine | $(CH_3)_3N$ | 3.5 |
| Ethyl chloride | $C_2H_5Cl$ | 12.2 |
| Ethyl amine | $C_2H_5NH_2$ | 16.6 |
| 1, 2 butadiene | $CH_2:C:CH.CH_3$ | 19.0 |

Note: The above boiling points are taken from literature and chemistry books and are approximately correct but not exact in that several values may be given for a number of the said substances.

I desire it to be understood, however, that my invention is not to be limited to the above substances which are given by way of example, but includes any and all substances which possess boiling or subliming points below 25° C. at one atmosphere pressure (760 mm. mercury absolute) and which are compatible with the liquid to be sprayed, i. e., which do not alter or diminish the useful properties thereof. It is also to be understood that with variations in the kinds of liquids to be sprayed, some of the volatile components might be more suitable in some cases than in others, while for other cases volatile components not mentioned might prove most desirable. For example, carbon dioxide is well suited to some aqueous solutions or mixtures, methyl chloride is well suited to many organic liquids, and in still other cases, mixtures might be most desirable.

Having now explained in detail the nature and principles of my invention, its advantages and uses, I will proceed to give some typical examples of its application. It will be clearly understood that I do not limit myself to these examples which are given merely for the purpose of illustrating some of the uses to which my invention may be put.

*Example 1.*—A moth repellant is made by dissolving 5 parts of para dichlorobenzene in 96.5 parts of a mixture of 3 parts of ethylene dichloride to 1 part of carbon tetrachloride. This solution, in a suitable container, is then cooled to about −50° C. to −60° C., which can conveniently be done by surrounding the said container with solid carbon dioxide. To the cooled mixture is added 13.5 parts of a similarly cooled natural gasoline which normally boils at about −45° C. at 1 atmosphere pressure. This gasoline will consist principally of propane, but may contain some other compounds such as traces of ethane and some of the butanes. The mixture is stirred, placed in a bottle previously cooled to below −50° C., the cap with a suitable valve and tube inserted and the cap sealed on by rolling or crimping. The bottle and its contents are now allowed to slowly rise to normal room temperature, say 25° C., when they are ready for use. The internal pressure of the contents of the bottle will be slightly in excess of atmospheric pressure and will be satisfactory for operating the valve and spray. If desired, the bottle and its contents may be allowed to rise in temperature sufficiently to cause the contents to start boiling gently, for the purpose of removing most of the air or similar gases from the container, and then capping.

*Example 2.*—To 80 parts of a fly spray solution consisting essentially of light petroleum oils, such as naphtha or kerosene, and containing extract of pyrethrum, and/or other insecticides and cooled to about −30° C., are added 20 parts of methyl chloride which have also been cooled to about −30° C. The mixture is stirred and then packaged as in Example 1 above. After introducing the valve and tube and sealing, the container and contents are allowed to warm up to room temperature, or about 25° C. The apparatus is then ready for use.

In connection with the foregoing examples it should be understood that in regions where normal atmospheric or room temperature is appreciably lower than 25° C., proportionately higher percentages of the volatile component or components should be used so that under normal operating temperatures the liquid as a whole will exert a pressure slightly greater than that of the atmosphere.

While the invention has been described in detail with specific examples, such examples are illustrative and are not given as limitations, since other modifications within the spirit and scope of the invention will be apparent to those skilled in the art.

What I claim is:

1. A method of making a liquid self-propellant consisting in cooling a volatile substance to substantially its boiling point, cooling a container with the liquid to be propelled to approximately the same temperature, then adding the volatile substance to the liquid in the container and finally sealing the container.

2. A method of making a liquid self-propellant consisting in cooling a volatile substance to its boiling point, cooling a container, cooling the liquid to be propelled to a temperature substantially equivalent to or below the boiling point of the volatile substance, adding the boiling volatile substance to the cooled liquid in the container, sealing the container, and then warming the resultant to normal atmospheric or room temperature.

3. A method of making a liquid self-propellant consisting in cooling to substantially their boiling points volatile materials whose boiling points at one atmosphere pressure absolute are below 25° C., cooling the liquid to be propelled to substantially the same temperature as the volatile materials, cooling a container to approximately a corresponding temperature, then placing the liquid and volatile materials in the container, and sealing the container.

4. A method of making a liquid self-propellant consisting in cooling by boiling a mixture of volatile materials, said volatile materials having a boiling point at one atmosphere pressure absolute below 25° C., cooling the liquid to be propelled to substantially the boiling point of the volatile materials, cooling the container to approximately the same temperature and then placing said liquid and materials in the container, and after sealing said container allowing the container and contents to warm up to normal atmospheric temperatures.

5. A method of making a liquid self-propellant consisting in cooling a volatile material whose boiling point at one atmosphere pressure absolute is below 25° C. by causing a portion of said material to boil or evaporate at one atmosphere pressure or less, cooling the liquid to be propelled to substantially the same temperature as the volatile material, cooling a container to approximately the same temperature, placing the liquid in the container then adding a part or all of the residue of said volatile material to the liquid.

6. A method of making a self-propellant liquid consisting in cooling by boiling a hydrocarbon that has its boiling point below 25° C. at one atmosphere pressure, cooling a liquid to be propelled and a container to substantially the boiling point of the hydrocarbon, then adding the hydrocarbon to the liquid in the container and finally sealing the container.

7. A method of making a self-propellant liquid consisting in boiling at atmospheric pressure or less a halogen derivative of a hydrocarbon whose boiling point at one atmosphere pressure is equal to or less than 25° C., cooling a container and a liquid to be propelled to substantially the temperature of the residue of the halogen derivative, then adding all or part of such cooled residue to the said liquid and finally sealing the container.

8. The method of making a liquid self-propellant consisting in cooling a volatile substance whose boiling point is below 25° C. to substantially its boiling point, cooling a container and the liquid to be propelled to substantially the boiling point of the volatile substance, then adding the volatile substance to the liquid in the container, sealing the container with a valve device and warming the resultant to normal atmosphere or room temperature, whereby the liquid will be propelled from the container when the valve is opened.

9. A method of making a liquid self-propellant consisting in cooling by boiling natural gasoline to its boiling point, cooling a container and a mixture comprising para dichlorobenzene, ethylene dichloride and carbon tetrachloride to substantially the temperature of the natural gasoline, adding the said gasoline to the mixture in the container and finally sealing the container.

10. A method of making a liquid self-propellant consisting in cooling by boiling methyl chloride to its boiling point, making a solution of light petroleum oils and extract of pyrethrum, cooling a container and the solution to substantially the same temperature of the methyl chloride, adding and stirring the methyl chloride into the solution in the cooled container and finally sealing the container.

11. A method of making a liquid self-propellant consisting in cooling dichlorodifluoromethane by boiling, making a mixture of carbon tetrachloride and chloroform, cooling a container and said mixture to the temperature of the dichlorodifluoromethane, then add the dichlorodifluoromethane to the mixture in the container and finally sealing the container.

CARL IDDINGS.